(12) United States Patent
Terrell

(10) Patent No.: US 10,668,849 B2
(45) Date of Patent: Jun. 2, 2020

(54) BED LOADER

(71) Applicant: Allen Lee Terrell, Union, MS (US)

(72) Inventor: Allen Lee Terrell, Union, MS (US)

(*) Notice: Subject to any disclaimer, the term of this patent is extended or adjusted under 35 U.S.C. 154(b) by 986 days.

(21) Appl. No.: 14/833,096

(22) Filed: Aug. 23, 2015

(65) Prior Publication Data

US 2016/0376133 A1     Dec. 29, 2016

Related U.S. Application Data

(60) Provisional application No. 62/185,586, filed on Jun. 27, 2015.

(51) Int. Cl.
*B60P 3/04* (2006.01)
*B66D 1/36* (2006.01)

(52) U.S. Cl.
CPC . *B60P 3/04* (2013.01); *B66D 1/36* (2013.01)

(58) Field of Classification Search
CPC .................................... B60P 3/04; B66D 1/36
See application file for complete search history.

(56) References Cited

U.S. PATENT DOCUMENTS

| | | | |
|---|---|---|---|
| 978,398 A * | 12/1910 | Richard | |
| 5,393,194 A * | 2/1995 | Smith | |
| 5,662,451 A | 9/1997 | Muzzi | |
| 5,975,831 A | 11/1999 | Martin | |
| 6,138,991 A | 10/2000 | Myers, Jr. | |
| 6,155,771 A | 12/2000 | Montz | |
| 6,530,738 B2 | 3/2003 | Maxwell | |
| 6,626,748 B2 | 9/2003 | Homer, Sr. | |
| 6,769,858 B1 | 8/2004 | Botler | |
| 7,136,246 B2 | 11/2006 | Khanna et al. | |
| 7,300,238 B1 | 11/2007 | James | |
| 7,544,032 B1 | 6/2009 | Scott, Jr. | |
| 7,575,120 B2 | 8/2009 | Beathy | |
| 7,896,604 B1 * | 3/2011 | Donlin | |
| 2001/0043852 A1 | 11/2001 | Maxwell | |
| 2002/0048504 A1 | 4/2002 | Jacobs | |
| 2014/0144861 A1 | 5/2014 | Davis | |
| 2016/0311666 A1 * | 10/2016 | Anderson | |

* cited by examiner

*Primary Examiner* — Michael E Gallion
(74) *Attorney, Agent, or Firm* — William C. West

(57) ABSTRACT

A bed loader for loading game animals and other loads on a four-wheel recreational vehicles and more particularly, a bed loader mounted on a winch-equipped recreational vehicle with a roof and a bed for loading game animals onto the bed of the recreational vehicle. In a preferred embodiment the bed loader comprises a front guide, a top forward guide, and a top rear guide, and the bed loader is designed to operate with the winch comprised of a rotating drum and a winch line wound on the drum. The front guide, the top forward guide, and the top rear guide provide a guiding means guiding the winch line from the winch over the roof of the vehicle to a load at the rear of the vehicle allowing the winch line to attach to the game animal, and pull the game animal into the bed of the vehicle.

20 Claims, 6 Drawing Sheets

BED LOADER

CROSS-REFERENCE TO RELATED APPLICATIONS

This application claims the benefit of U.S. Provisional Application No. 62/185,586, Bed Loader, filed Jun. 27, 2015.

FEDERALLY SPONSORED RESEARCH

Not applicable.

BACKGROUND OF THE INVENTION

Field of the Invention

This invention relates to recreational vehicles with a roof, a winch, and a bed, and a device for loading heavy loads, such as game animals, and more particularly, to a bed loader mounted on a winch-equipped recreational vehicle for loading game animals onto the bed of the recreational vehicle. In a preferred embodiment the bed loader comprises a front guide, a top forward guide, and a top rear guide, and the bed loader is designed to operate with a winch comprised of a rotating drum and a winch line wound on the drum. The front guide is mounted on a front of the recreational vehicle above the winch, the top forward guide is mounted near a forward roof edge of the roof, and the top rear guide is mounted near a roof rear edge that is next to the vehicle bed. The winch line is guided from the winch drum through the front guide, the top forward guide, and the top rear guide to reach the game animal or other load to the rear or the vehicle's bed. The top forward guide is disposed aligned with the front guide and the top rear guide for guiding the winch line from the front guide, to the top front guide, to the rear guide, and to the game animal and the other load to the rear the recreational vehicle bed.

One of the problems associated with the handling heavy objects, such as game animals in the field, is the loading of the heavy objects in or on the bed of the recreational vehicle. The need exist for a readily available loading device that is simple to use and makes use of equipment generally available on many recreational vehicles.

Thus, it is object of this invention to provide a bed loader for pulling or moving game animals or other heavy objects into the vehicle bed. Another object of the invention is to provide a bed loader that operates with the winch mounted on the recreational vehicle. The bed loader comprises a front guide, a top forward guide, and a top rear guide, with the front guide used to guide the winch line up to the top front guide that is mounted generally adjacent to the roof forward edge of the recreational vehicle, and then the top forward guide is used to guide the winch line to the top rear guide that is used to guide the winch line down to the game animal or other object to be loaded.

The front guide is positioned on the recreational vehicle above the winch for receiving the winch line from the winch and guiding the winch line upwardly to the top forward guide mounted on the roof. The top front guide, located generally mounted above a front viewing area, such as a windshield, receives and guides the winch line rearwardly to be received and guided by the top rear guide that is mounted on the roof near the roof rear edge, and the winch line it then guided downwardly to the game animal or object to be loaded. A bag or other holding device can then be mounted on a hook at the end of the winch line and the game animal positioned in the holding device and the winch used to pull the game animal onto the bed.

SUMMARY OF THE INVENTION

These and other objects of the invention are provided in a bed loader for mounting on a recreational vehicle having a winch mounted on the front end and roof of the recreational vehicle. The winch comprise a winch drum having a winch line wound thereon and when unwound the winch line can be placed pulled through: a front guide, mounted above the winch for guiding the winch line up to a top forward guide mounted generally adjacent to the roof forward edge above the front viewing area for guiding the winch line to a top rear guide mounted adjacent to the roof rear edge that is next to the bed. The front guide, the top forward guide, and the top rear guide are generally centered on a vehicle centerline running from the front of the vehicle to the rear of the vehicle and the guides are designed to receive and guide the winch line up and over the roof of the recreational vehicle and then downwardly to a holding means attached to the end of the winch line for engaging an object and loading the object in a rear bed of the vehicle.

BRIEF DESCRIPTION OF THE DRAWING

The invention will be better understood by reference to the accompanying drawings, wherein.

DESCRIPTION OF THE PREFERRED EMBODIMENTS

Figure 1A:
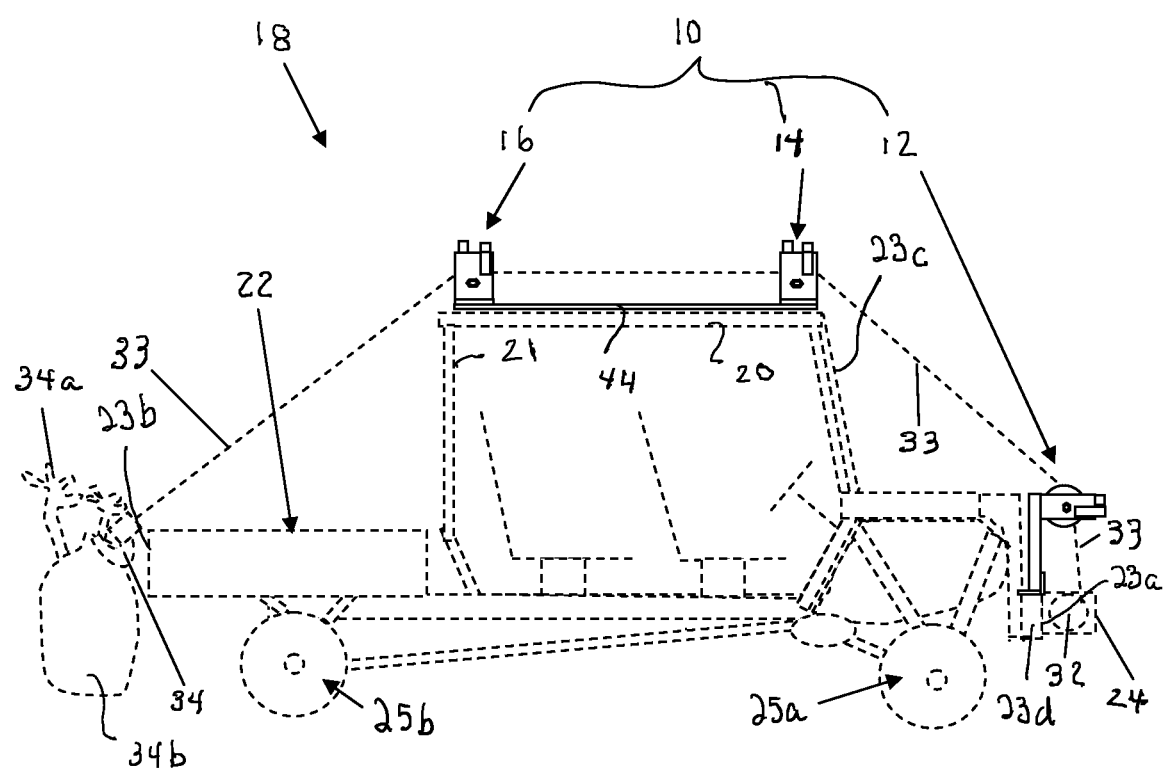
FIG. 1A is a side view of a preferred embodiment of the bed loader shown with the solid lines mounted on a four-wheel recreational vehicle equipped with a conventional winch that is shown with dashed lines.
Figure 1B:
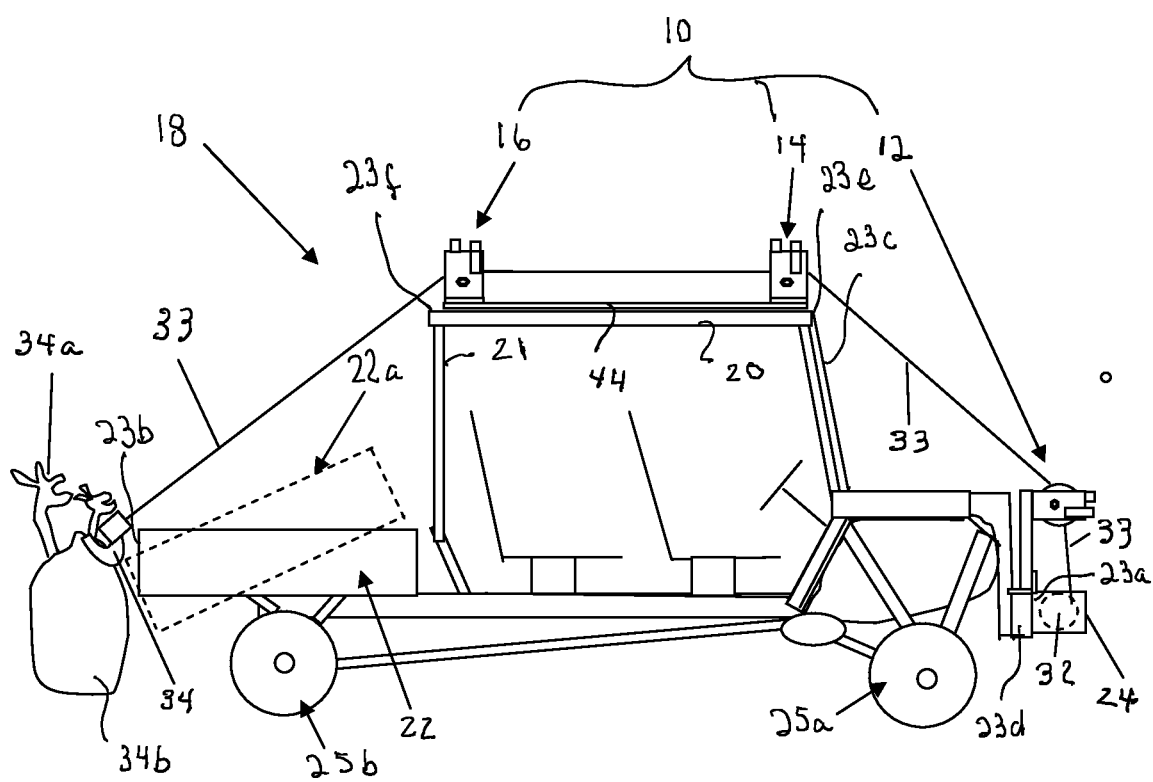
FIG. 1B is a side view of a preferred embodiment on a recreational vehicle shown in FIG. 1A.
Figure 2:
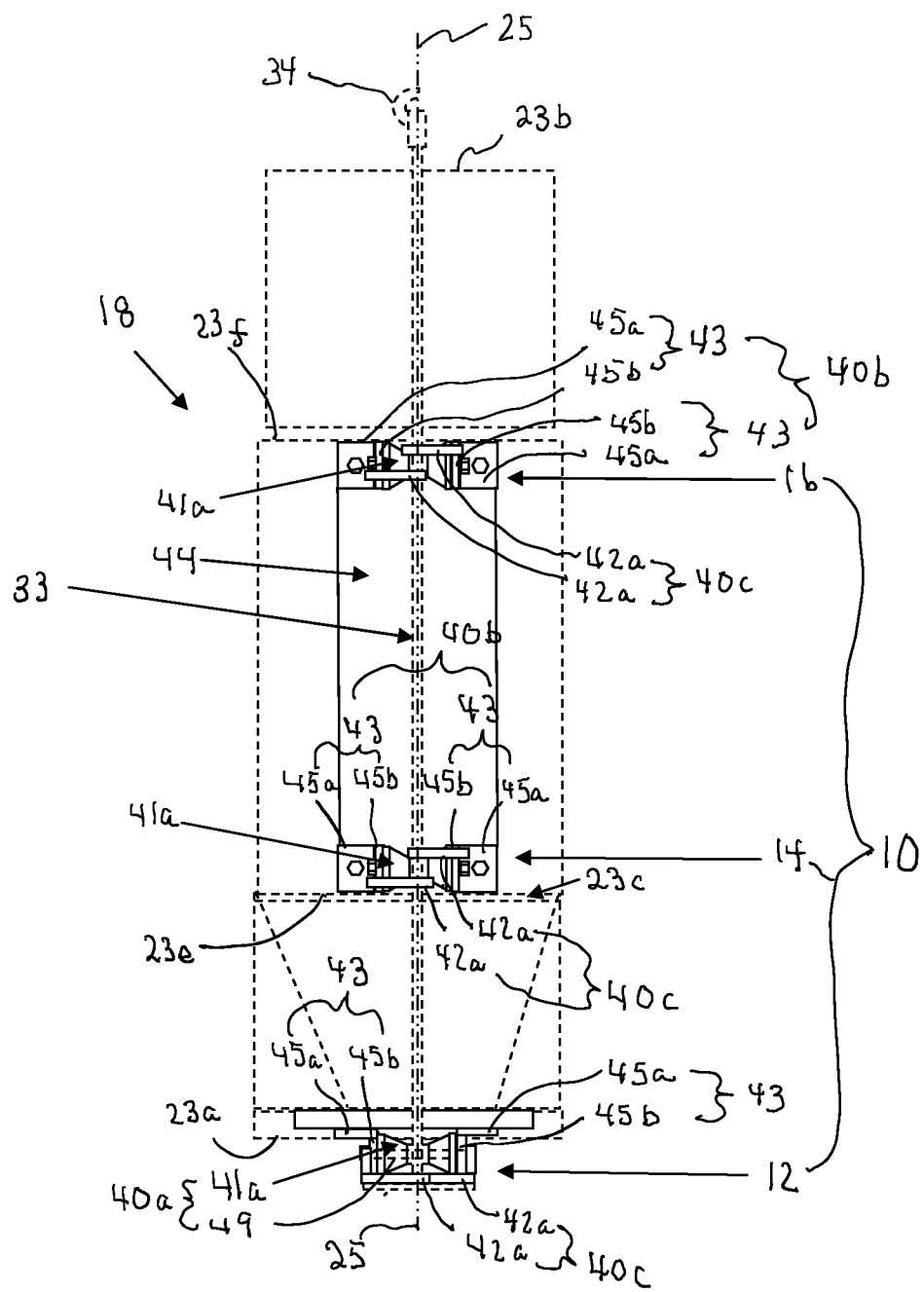
FIG. 2 is a top view of the preferred embodiment of the present invention shown with the solid lines.
Figure 3A:
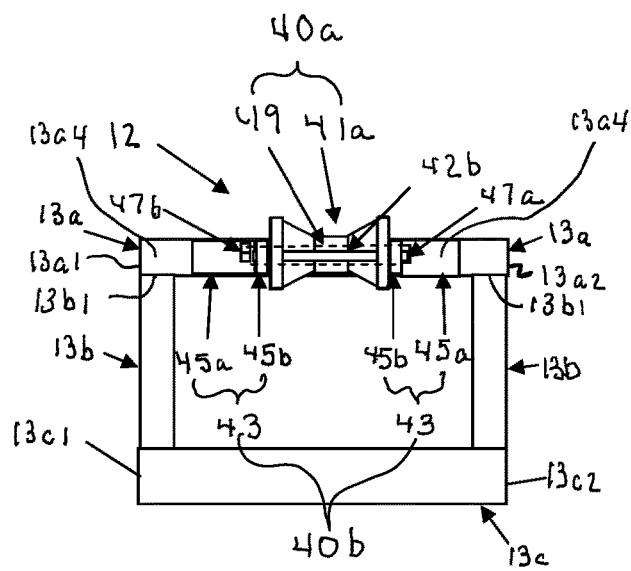
FIG. 3A is a frontal view of a front guide with retaining bars of the present invention.
Figure 3B:
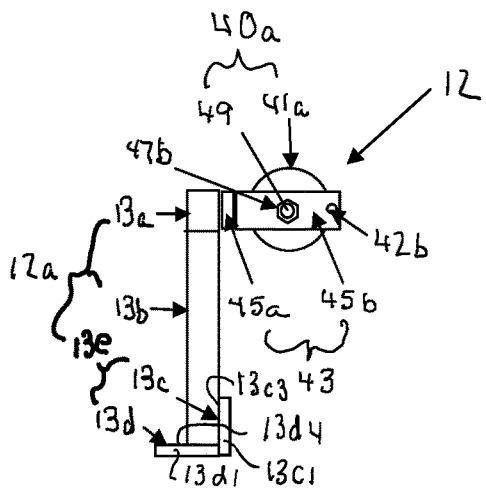
FIG. 3B is a side view of the front guide with the retaining bars of the present invention.

Referring initially to FIGS. 1A, 1B, and 2 of the drawings, the bed loader of this invention is generally illustrated by reference numeral 10. The bed loader 10 comprises a front guide 12, a top forward guide 14, and a top rear guide 16. The bed loader 10 may be mounted on a four-wheel recreational vehicle 18, fitted with a roof 20, a roll cage 21, a bed 22 and a winch 24. The winch 24 is mounted on a front end 23a of the recreational vehicle 18, generally on a bumper 23d, and the front guide 12, the top forward guide 14, and the top rear guide 16 are spaced on the recreational vehicle 18 in alignment with a winch line 33 running along a vehicle longitudinal axis 25 running from the front end 23a to a rear end 23b of the recreational vehicle 18 as shown in FIG. 2. The winch line 33 is fitted with a typical cable hook 34 and wound on a winch drum 32 that is as illustrated in FIG. 1A. The winch line 33 is of a sufficient length to allow the cable hook 34 to engage loads or a game animal, such as a deer 34a in a bag 34b, off the rear end 23b of the recreational vehicle 18.

Referring again to FIG. 1A, the front guide 12 of the bed loader 10 is mounted on the bumper 23d of the recreational vehicle 18 above the winch 24 and the front guide 12 operates to receive the winch line 33 from the winch drum 32 and guide the winch line 33 to the top forward guide 14 which guides the winch line 33 to the top rear guide 16 when the winch drum 32a is winding and unwinding the winch line 33. Accordingly, the winch line 33 extends from the winch 24 upwardly to the front guide 12, and then upwardly across a front view area, such as a windshield 23c to the top forward guide 14 and then to the top rear guide 16 and then may extend to the rear end 23b of the recreational vehicle 18 as illustrated in FIGS. 1A, 1B, and 2. The bed 22 may be placed in a tilted position 22a as shown by the dashed outline in FIG. 1B to more easily load the game animal, such as the deer 34a.

Accordingly, the winch line 33 may be extended farther rearwardly from the top rear guide 16 by operation of the winch 24 and rotating the winch drum 32 in reverse direction, to lead out the winch line 33 from the winch drum 32. The winch line 33 is guided downwardly from the top rear guide 16 in position such that the cable hook 34 on the winch line 33, as illustrated in FIGS. 1A and 1B, is then extended to the game animal, such as the deer 34a in the bag 34b. The winch 24 can then be operated to rotate the winch drum 32 in the opposite direction rewinding the winch line 33 on the winch drum 32 to load the game animal in the bed 22.

Figure 4A:
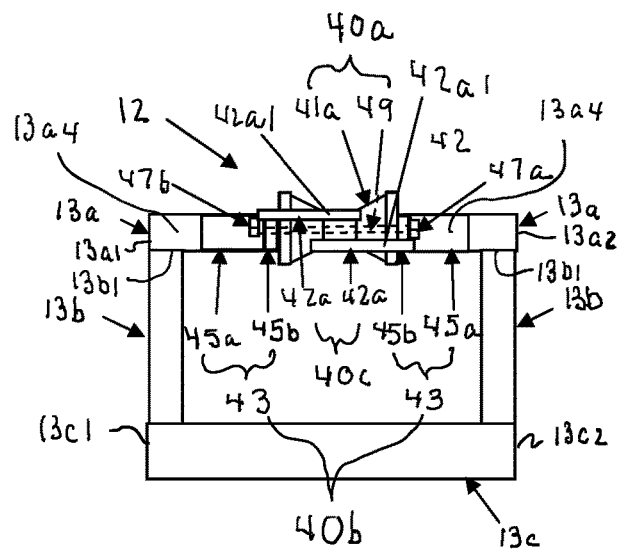
FIG. 4A is a frontal view of the front guide with a retaining pin of the present invention.
Figure 4B:
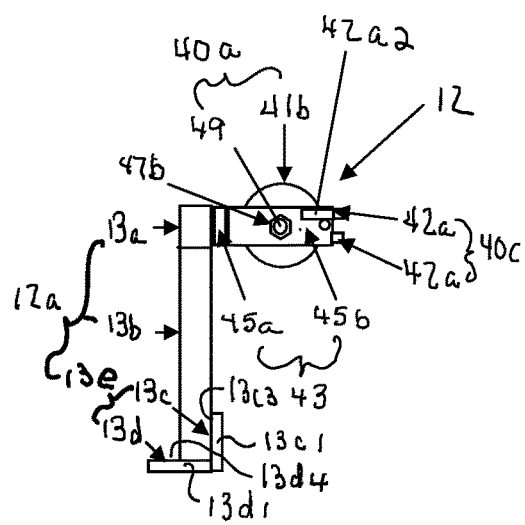
FIG. 4B is a side view of the front guide with the retaining pin of the present invention.
Figure 5A:
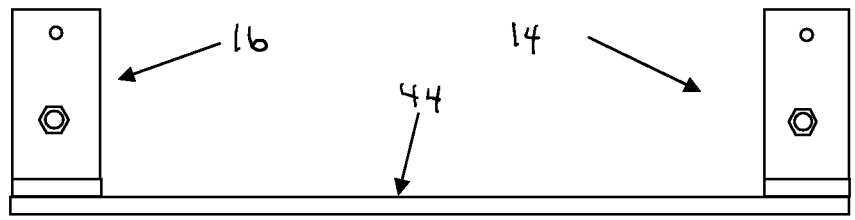
FIG. 5A is a side view of the top forward guide and the top rear guide of the present invention.
Figure 5B:
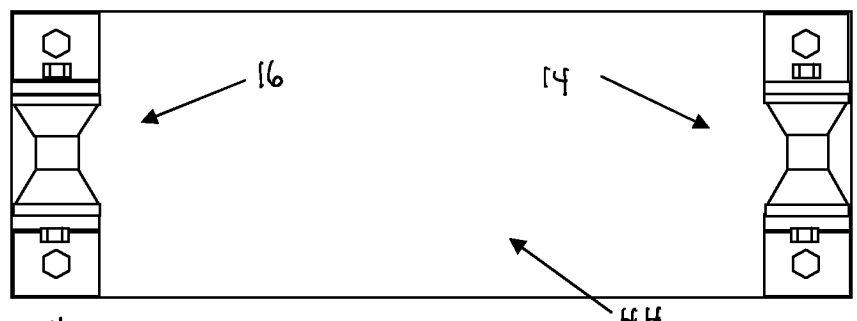
FIG. 5B is a side view of e view of the top forward guide and the top rear guide of the present invention.
Figure 6A:
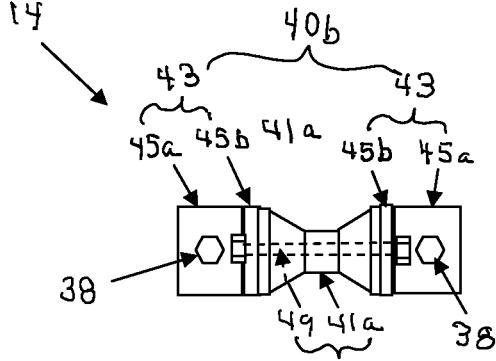
FIG. 6A is a top view of e view of the top forward guide.
Figure 6B:
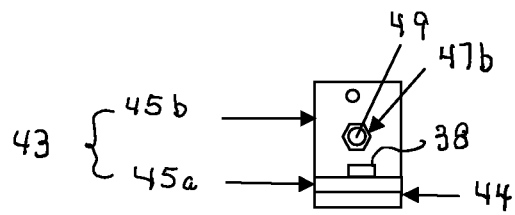
FIG. 6B is an end view of the top forward guide.

Referring now to FIG. 2 of the drawings, in a preferred embodiment of the invention the front guide 12, the top forward guide 14, and the top rear guide 16 each comprise at least a guide means 40a, a guide Support 40b, and a retaining means 40b as shown in for front guide 12. Referring to FIGS. 3A, 3B, 4A, and 4B, the guide means 40a may comprise an hourglass roller 41a and a shaft bolt 49. Looking again to FIG. 2 and more specifically to the front guide 12, the guide support 40b may be two "L" brackets 43, each of the two "L" brackets 43 having a first leg 45a running laterally traverse to the vehicle longitudinal axis 25 opposite the first leg 45a of the other, and the guide means 40b, an hourglass roller 41a, disposed between the second leg 45b of the one "L" bracket 43 and the second leg 45b of the other "L" bracket 43. Referring to FIGS. 2, 4A and 4B, the retaining means 40b of the front guide 12, the top forward guide 14, and the top rear guide 16 may be two retaining bars 42a with each having a long leg 42a1 disposed parallel to the shaft bolt 49 and a short leg 42a2 that is parallel and adjacent to the second leg 45b and perpendicular to the first leg 45a. Looking to FIGS. 3A and 3B, the retaining means 40c may also be a retaining pin 42b, Such as a ⅝ inch quick-release pin commonly available at vendors like McMaster-Carr. The retaining pin 42b can easily be removed to place the winch line 33 in the guide, such as the front guide 12. The retaining pin 42b is disposed placed through the second leg 45b of each "L" bracket 43 of each guide, such as front guide 12, to hold the winch line 33 in the guide. Looking to FIGS. 3A, 3B, 4A and 4B, the front guide 12 is attached to a front mount 12a. The front mount 12a may be rectangular and comprises a top bar 13a, two identical side bars 13b, a front plate 13c, and a bottom plate 13d. The front plate 13c and the bottom plate 13d are rectangular and are attached to each other forming a base channel 13e that is "L" shaped. The side bars 13b are parallel to each other and run vertically, and are located between the top bar 13a and the bottom plate 13d that are running horizontally. Looking at FIGS. 3A and 4A, one side bar 13b forms one side of the rectangular front mount 12a and the other side bar 13b forms the opposite side of the rectangular front mount 12a and the side bars 13b extend upward from an upper face 13d4 of the bottom plate 13d, and are adjacent to a back face 13c3 of the front plate 13c. The top bar 13a is mounted to an upper end 13b1 of each of the top side bars 13b. The base channel 13e is attached to the two side bars 13b long the back face 13c3 of the front plate 13c and the upper face 13d4 of the bottom plate 13d4. The top bar 13c and the side bars 13b may be made of square tubing, preferably 1.5 inch steel tubing between 0.15 and 0.25 inches thick, preferably 0.125 inches thick. The top bar 13c is between 1-3 feet long, preferably 2 feet long, and the side bars are between 1-3 feet long, preferably 1.5 feet long. The front plate 13c n the bottom plate 13d are equal to the length to the top bar 13a and generally 0.2 to 0.75 of an inch thick, preferably 0.25 inches, and 2.5 inches wide. The front plate 13c runs horizontally and has a back face 13c3 that is oriented vertically and attached, preferably wielded, to the side bars 13b, and to the upper face 13 d4 of the bottom plate 13d s attached, preferably welded, to the two side bars 13b. The front guide 12 is attached, preferably welded, to a front face 13.a4 of the top bar 13a. FIG. 5A shows an enlarged side view of the top forward guide 14 and the top rear guide 16 on a base plate 44 as shown in FIGS. 1A, 1B, and 2 but without the retaining means 40c, such as the retaining bars 42a or the retaining pin 42b. FIG. 5B shows an enlarged top view of the top forward guide 14 and the top rear guide 16 of FIG. 2. FIG. 6A shows a top view of the top forward guide 14 with an hourglass roller 41a and without the retaining means 40c. FIG. 6B shows an end view of the top forward guide 14 of FIG. 6A, illustrating the shaft bolt 49 secured by a shaft nut 47b. The shaft bolt (49) is inserted though the second leg (45b) of the each the two "L" brackets of the guide Support (40b).

Looking again to FIG. 6A, the first leg 45a of the "L" bracket 43 is drilled for a roof bolt 38 that secures the "L" bracket 43 to the roof 20. The roof bolt 38 is 0.25 to 5 inches long and 0.25 to 0.5 inches in diameter allowing the roof bolt 38 to penetrate the first leg 45a, the base plate 44 where used, and the roof and be secured by a fastener, such as a nut. The second leg 45b may be a plate 2 to 6 inches long, 1 to 5 inches wide, and ½ inch thick. The first leg 45a is 2 to 6 inches long, 1 to 5 inches wide and 0.25 to 0.75 inches thick. The second leg 45*b* may be welded to the first leg 45*a*. The first leg 45*a* and the second leg 45*b* may are made of a high strength material such as carbon steel.

Figure 6C:
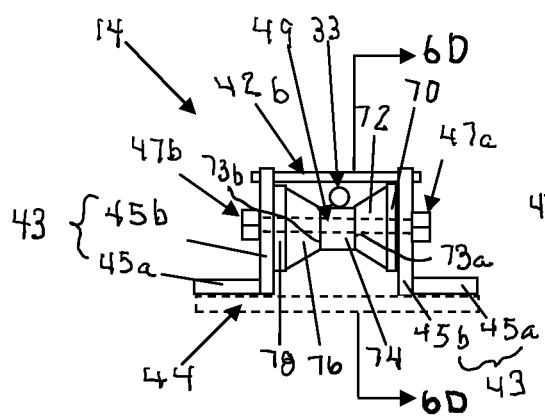
FIG. 6C is a side view of the top forward guide with a retaining pin as the retaining means.
Figures 6D, 7:
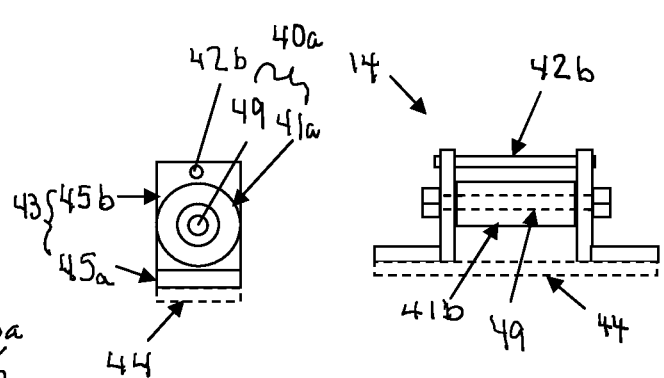
FIG. 6D is a sectional view along line 6D-6D of FIG. 6C.
FIG. 7 shows the top front guide with a cylindrical roller as the guide means.
Figure 8A:
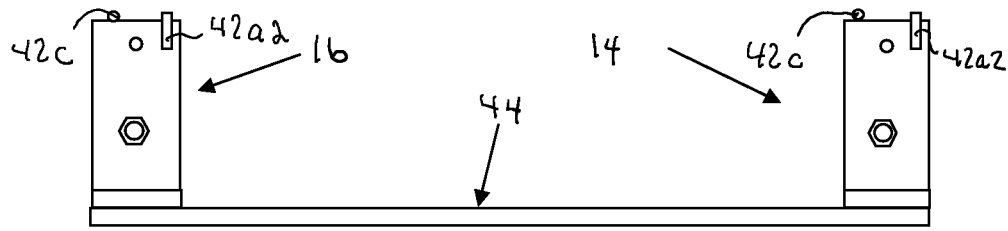
FIG. 8A is a top view of the top forward guide and the top rear guide of the present invention.
Figure 8B:
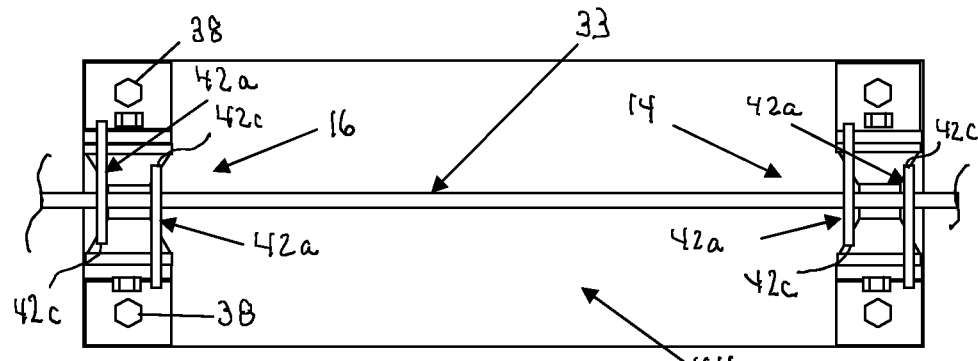
FIG. 8B is a side view of the top forward guide and the top rear guide of the present invention.

Looking to FIGS. 6C and 6D, the guide means 40*a* of the top forward guide 14 may comprise a roller, such as the hourglass roller 41*a*, and a shaft bolt 49, with the hourglass roller 41*a* rotating on the shaft bolt 49 that is inserted through the second leg 45*b* of the each "L" bracket 43 and the hourglass roller 41*a*. The shaft bolt 49 is secured on one end by a head 47*a* and the other end by shaft nut 47*b*, allowing the hourglass roller 41*a* to rotate as the winch line 33 in FIG. 2 moves over the hourglass roller 41*a* to the rear end 23*b* of the recreational vehicle 18 and is retracted back towards the front end 23*a*. Referring to FIGS. 6A and 6B, the "L" brackets 43 can be mounted to a base plate 44 and secured to the roof 20 and the roll cage 21 of FIGS. 1A and 1B by a roof bolt 38 through the first leg 45*a* of each 'L" bracket 43. Looking to FIG. 2, the base plate 44 is centered on the vehicle longitudinal axis 25 and the base plate 44 runs from the roof forward edge 23*e* to the roof rear edge 23*f*.

Looking again to FIG. 6C, the hourglass roller 41*a* comprises a first disc portion 70 adjacent to a first portion 72 that is conically shaped and adjacent to a uniform circular middle portion 74 that is adjacent to a conically shaped second portion 76 that is adjacent to a second disc portion 78; the middle portion 74 being cylindrical and running from the first portion 72 to the second portion 76; the first portion 72 and the second portion 76 configured to cradle the winch line 33 of FIG. 2 onto the middle portion 74. The first portion (72) and the second portion (76) tapering down from the first disc portion (70) and the second disc portion (78), respectively, to the middle portion (74).

Referring to FIG. 7, an elongated cylindrical rod, the cylindrical roller 41*b*, may be mounted between the two "L" brackets 43 of the guide support 40*b* of the each guide, such as the top forward guide 14, and the cylindrical roller 41*b* disposed placed to rotate on the shaft bolt 49. The cylindrical roller 41*b* may also be removed and the winch line 33 allows to slide over the shaft bolt 49.

Figure 9A:
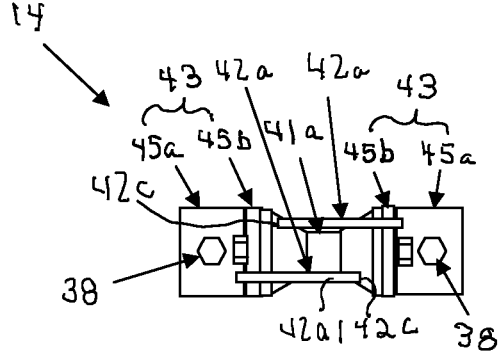
FIG. 9A is a top view of the top forward guide with two retaining bars as the retaining means.
Figure 9B:
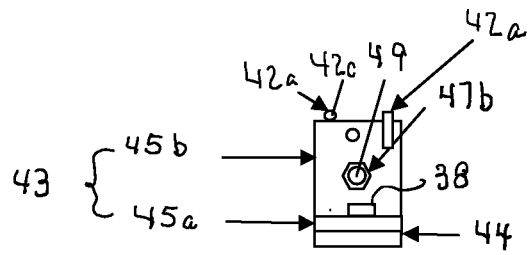
FIG. 9B is an end view of the top forward guide the two retaining bars as the retaining means.
Figure 9C:
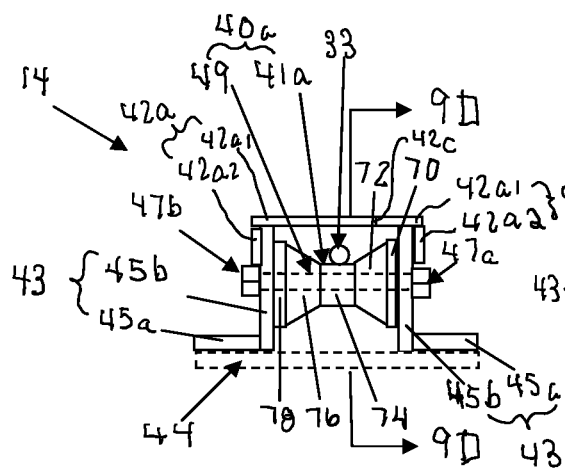
FIG. 9C is a side view of the top forward guide with two retaining bars as the retaining means.
Figure 9D:
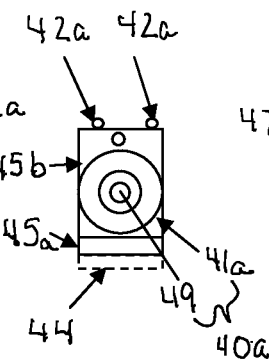
FIG. 9D is a sectional view along line 9D-9D of FIG. 9C.
Figure 10:
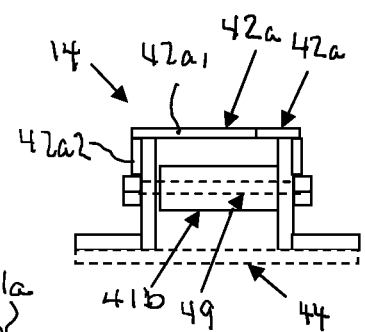
FIG. 10 shows the top front guide with the cylindrical roller as the guide means and the two retaining bars as the retaining means.

Looking to FIGS. 8A, 8B, 9A, and 9B, and more particularly 9*c*, the retaining means 40*c* may be a two retaining bars 42*a* that are "L" shaped each having a long leg 42*a*1, a short leg 42*a*2 and a distal end 42*c*. The short leg 42*a*2 is mounted on the "L" bracket adjacent to the second leg 45*b* and perpendicular to the first leg 45*a*. When the retaining means 40*c* is two retaining bars 42*a*, the retaining bars 42*a* can be mounted on the front guide 12 and the top rear guide 16 as shown in the top forward guide 14 in FIG. 9C disposed placed so that the winch line 33 to be inserted around the distal end 42*c* of each retaining bar 42*a* to ride on the hourglass roller 41*a* of the guide means 40*a*. When the two retaining bars 42*a* are used, one on each "L" bracket 43 as shown in FIGS. 9A and 9C, the retaining bars 42*a* are mounted parallel to each other with the distal end 42*c* of the each retaining bar pointed opposite the distal end 42*c* of the other retaining bar 42*a*. This allows the winch line 33 to be inserted around the distal end 42*c* of the each retaining bar 42*a*. FIG. 10 shows the retaining bars 42*a* used with the top forward guide 14 of FIG. 7.

Referring again to FIGS. 1A, 1B, and 2, the bed loader 10 of this invention is made to use of the winch 24, winch drum 32*a*, winch line 33, and cable hook 34 provided on many recreational vehicles 18. The winch 24 performs a key role and is an indispensable component for operating the bed loader 10. It will be further appreciated that the bed loader 10 can be used for many purposes other than loading game animal in the bed 22. For example, the winch 24 on the front end 23*a* of the recreational vehicle 18 can be used with the bed loader 10 to load/pull items such as sacks of sand and the like and other objects, by utilizing the winch 24 and the winch line 33 in combination with the front guide 12, the top forward guide 14, and the top rear guide 16 of the bed loader 10, in the same manner described above with regard to the handling and loading the deer 34*a*. Since the top rear guide 16 between the front wheels 25*a* and the rear wheels 25*b* of the recreational vehicle 18, the recreational vehicle 18 is relatively stable when a heavy load, such as the deer 34*a* is attached to the winch line 33. The recreational vehicle 18 that has four wheels is much more stable and is a preferred vehicle for installation and use of the bed loader 10, although the bed loader 10 may be mounted on a three wheel recreational vehicle (not shown).

Although the present invention has been described in considerable detail with reference to preferred versions thereof, other versions are possible. Therefore, the spirit and scope of the appended claims should not be limited to the description of the preferred versions contained herein. Various deviations and modification may be made within the spirit and scope of this invention without departing from the main theme thereof.

I claim:

1. For handling and loading heavy objects, such as a game animal, into an recreational vehicle having a bed, a winch, a winch line and a roof, a bed loader comprising a front guide, a top forward guide, and a top rear guide,
    the front guide configured to guide the winch line to the top forward guide;
    the top forward guide configured to receive the winch line from the front guide and guide the winch line to the top rear guide;
    the front guide mounted above the winch;
    the top forward guide disposed aligned between the front guide and the top rear guide; the top rear guide receiving the winch line from the top forward guide and guiding the winch line to the bed of the recreational vehicle to the game animal to be loaded;
    the top forward guide mounted forward of the top rear guide; the top rear guide guiding the winch line between the top forward guide and the bed of the recreational vehicle; and any of the front guide, the top forward guide, and the top rear guide further comprising a retaining means, the winch line disposed below the retaining means; and the retaining means retaining the winch line in any of the front guide, the top forward guide, and the top rear guide; and the retaining means preventing the winch line from moving out of and away from any of the front guide, the top forward guide, and the top rear guide.

2. The bed loader of claim 1 wherein the front guide, the top forward guide, and the top rear guide each comprise a guide means, a guide support, and the retaining means;
    the guide means comprising a shaft bolt;
    the guide support comprising two "L" brackets; the two "L" brackets each having a first leg substantially perpendicular to a second leg; the first leg of each "L" bracket running laterally traverse and to a vehicle longitudinal axis with one "L" bracket on each side of the vehicle longitudinal axis;
    the first leg of the each of the two "L" brackets running from the second leg opposite the first leg of a other "L" bracket;

the each the two "L" brackets mounted to a base plate and the base plate secured to the roof and a roll cage by a roof bolt through the first leg of the each "L" brackets; the base plate centered on the vehicle longitudinal axis and the base plate running across the roof from a roof forward edge to a roof rear edge; the shaft bolt substantially parallel to the base plate; the shaft bolt inserted though the second leg of the each the two "L" brackets of the guide support; the shaft bolt running substantially perpendicular to the vehicle longitudinal axis; and the winch line running above the shaft bolt.

3. The bed loader of claim 2 wherein the retaining means of the front guide, the top forward guide, and the top rear guide comprises two retaining bars with each retaining bar having a long leg, a short leg, and a distal end; one of the two retaining bars mounted on the second leg of the each of the two "L" brackets of the guide support and a other retaining bar mounted on the second leg of the other "L" bracket of the guide support; the distal end of one of the two retaining bars pointed opposite of the distal end of the other retaining bar; the long leg of the each of the two retaining bars disposed parallel to the shaft bolt and the short leg disposed parallel and adjacent to the second leg of the "L" bracket, and further disposed substantially perpendicular to the first leg of the "L" bracket and the long leg.

4. The bed loader of claim 2 wherein the retaining means of the front guide, the top forward guide, and the top rear guide comprises a retaining pin inserted through the second leg of the one "L" bracket of the guide support and inserted through the second leg of the other "L" bracket of the guide support; the retaining pin disposed substantially parallel to the shaft bolt; the winch line positioned between the retaining pin and the guide means; the retaining pin retaining the winch line in the of the front guide, the top forward guide, and the top rear guide.

5. The bed loader of claim 2 wherein the guide means further comprises an hourglass roller;
the hourglass roller further comprising a first disc portion adjacent to a first portion that is adjacent to a middle portion that is adjacent to a second portion that is adjacent to a second disc portion; the first portion and the second portion being conically shaped; and the first portion and the second portion tapering down from the first disc portion and the second disc portion, respectively, to the middle portion;
the middle portion being cylindrical and located between the first portion and the second portion; the first portion and the second portion configured to place the
winch line onto the middle portion; the first portion located between the middle portion and the first disc portion; the second portion located between the middle
portion and the second disc portion; and the hourglass roller configured to rotate on the shaft bolt.

6. The bed loader of claim 2 wherein the guide means further comprises a cylindrical roller;
and the cylindrical roller configured to rotate on the shaft bolt.

7. The bed loader of claim 2 wherein the front guide is attached to a front mount;
the front mount comprising a top bar, two side bars, a front plate, and a bottom plate; the two side bars being identical;
the front plate and the bottom plate attached to each other forming a base channel;
the two side bars being are substantially parallel to each other and running substantially vertically, and located between the top bar and the bottom plate that are running substantially horizontally;
one side bar forming one side of the front mount and a other side bar forming an opposite side of the front mount that is substantially rectangular;
the two side bars extending upward from an upper face of the bottom plate and are adjacent to a back face of the front plate;
the top bar mounted on an upper end of each of the two side bars; and
the base channel attached to the two side bars along the back face of the front plate and the upper face of the bottom plate; and the front guide mounted to a front face of the top bar.

8. For handling and loading heavy objects, such as a game animal, into an recreational vehicle having a bed, a winch, a winch line and a roof, a bed loader comprising a front guide, a top forward guide, and a top rear guide,
the front guide configured to guide the winch line to the top forward guide;
the top forward guide configured to receive the winch line from the front guide and guide the winch line to the top rear guide;
the front guide mounted above the winch;
the top forward guide disposed aligned between the front guide and the top rear guide;
the top rear guide receiving the winch line from the top forward guide and guiding the winch line to the bed of the recreational vehicle to the game animal to be loaded;
the top forward guide mounted forward of the top rear guide; the top rear guide guiding the winch line between the top forward guide and the bed of the recreational vehicle; and wherein the front guide, the top forward guide, and the top rear guide each comprise a guide means, a guide support, and a retaining means;
the guide means comprising a shaft bolt;
the guide support comprising two "L" brackets; the two "L" brackets each having a first leg substantially perpendicular to a second leg; the first leg of each "L" bracket running laterally traverse and to a vehicle longitudinal axis with one "L" bracket on each side of the vehicle longitudinal axis;
the first leg of the each of the two "L" brackets running from the second leg opposite the first leg of a other "L" bracket;
the each the two "L" brackets mounted to a base plate and the base plate secured to the roof and a roll cage by a roof bolt through the first leg of the each "L" brackets;
the base plate centered on the vehicle longitudinal axis and the base plate running across the roof from a roof forward edge to a roof rear edge; the shaft bolt substantially parallel to the base plate; the shaft bolt inserted though the second leg of the each the two "L" brackets of the guide support; the shaft bolt running substantially perpendicular to the vehicle longitudinal axis; and the winch line running above the shaft bolt.

9. The bed loader of claim 8 wherein the retaining means of the front guide, the top forward guide, and the top rear guide comprises two retaining bars with each retaining bar having a long leg, a short leg, and a distal end; one of the two retaining bars mounted on the second leg of the each of the two "L" brackets of the guide support and a other retaining bar mounted on the second leg of the other "L" bracket of the guide support; the distal end of one of the two retaining bars pointed opposite of the distal end of the other retaining bar; the long leg of the each of the two retaining bars disposed parallel to the shaft bolt and the short leg disposed parallel and adjacent to the second leg of the "L" bracket, and further disposed substantially perpendicular to the first leg of the "L" bracket and the long leg.

10. The bed loader of claim 8 wherein the retaining means of the front guide, the top forward guide, and the top rear guide comprises a retaining pin inserted through the second leg of the one "L" bracket of the guide support and inserted through the second leg of the other "L" bracket of the guide support; the retaining pin disposed substantially parallel to the shaft bolt; the winch line positioned between the retaining pin and the guide means; the retaining pin retaining the winch line in the of the front guide, the top forward guide, and the top rear guide.

11. The bed loader of claim 8 wherein the guide means further comprises an hourglass roller;
the hourglass roller further comprising a first disc portion adjacent to a first portion that is adjacent to a middle portion that is adjacent to a second portion that is adjacent to a second disc portion; the first portion and the second portion being conically shaped; and the first portion and the second portion tapering down from the first disc portion and the second disc portion, respectively, to the middle portion;
the middle portion being cylindrical and located between the first portion and the second portion; the first portion and the second portion configured to place the winch line onto the middle portion; the first portion located between the middle portion and the first disc portion; the second portion located between the middle portion and the second disc portion; and the hourglass roller configured to rotate on the shaft bolt.

12. The bed loader of claim 8 wherein the guide means further comprises a cylindrical roller; and the cylindrical roller configured to rotate on the shaft bolt.

13. The bed loader of claim 8 wherein the front guide is attached to a front mount;
the front mount comprising a top bar, two side bars, a front plate, and a bottom plate; the two side bars being identical;
the front plate and the bottom plate attached to each other forming a base channel; the two side bars being are substantially parallel to each other and running substantially vertically, and located between the top bar and the bottom plate that are running substantially horizontally;
one side bar forming one side of the front mount and a other side bar forming an opposite side of the front mount that is substantially rectangular;
the two side bars extending upward from an upper face of the bottom plate and are adjacent to a back face of the front plate;
the top bar mounted on an upper end of each of the two side bars; and
the base channel attached to the two side bars along the back face of the front plate and the upper face of the bottom plate; and the front guide mounted to a front face of the top bar.

14. For handling and loading heavy objects, such as a game animal, into an recreational vehicle having a bed, a winch, a winch line and a roof, a bed loader comprising a front guide, a top forward guide, and a top rear guide,
the front guide configured to guide the winch line to the top forward guide;
the top forward guide configured to receive the winch line from the front guide and guide the winch line to the top rear guide;
the front guide mounted above the winch;
the top forward guide disposed aligned between the front guide and the top rear guide; the top rear guide receiving the winch line from the top forward guide and guiding the winch line to the bed of the recreational vehicle to the game animal to be loaded;
the top forward guide mounted forward of the top rear guide; the top rear guide guiding the winch line between the top forward guide and the bed of the recreational vehicle; and any of the front guide, the top forward guide, and the top rear guide further comprising a retaining means; the winch line riding below the retaining means; the retaining means retaining the winch line in any of the front guide, the top forward guide, and the top rear guide; and the retaining means being a retaining pin, preventing the winch line from moving out of and away from any of the front guide, the top forward guide, and the top rear guide.

15. The bed loader of claim 14 wherein the front guide, the top forward guide, and the top rear guide each comprise a guide means, a guide support, and the retaining means;
the guide means comprising a shaft bolt;
the guide support comprising two "L" brackets; the two "L" brackets each having a first leg substantially perpendicular to a second leg;
the first leg of each "L" bracket running laterally traverse and to a vehicle longitudinal axis with one "L" bracket on each side of the vehicle longitudinal axis;
the first leg of the each of the two "L" brackets running from the second leg opposite the first leg of a other "L" bracket.

16. The bed loader of claim 15 wherein the guide means further comprises an hourglass roller;
the hourglass roller further comprising a first disc portion adjacent to a first portion that is adjacent to a middle portion that is adjacent to a second portion that is adjacent to a second disc portion; the first portion and the second portion being conically shaped; and the first portion and the second portion tapering down from the first disc portion and the second disc portion, respectively, to the middle portion;
the middle portion being cylindrical and located between the first portion and the second portion; the first portion and the second portion configured to place the winch line onto the middle portion; the first portion located between the middle portion and the first disc portion; the second portion located between the middle portion and the second disc portion; and the hourglass roller configured to rotate on the shaft bolt.

17. The bed loader of claim 15 wherein the guide means further comprises a cylindrical roller;
and the cylindrical roller configured to rotate on the shaft bolt.

18. The bed loader of claim 15 wherein the front guide is attached to a front mount;
the front mount comprising a top bar, two side bars, a front plate, and a bottom plate; the two side bars being identical;
the front plate and the bottom plate attached to each other forming a base channel;
the two side bars being are substantially parallel to each other and running substantially vertically, and located between the top bar and the bottom plate that are running substantially horizontally;

one side bar forming one side of the front mount and a other side bar forming an opposite side of the front mount that is substantially rectangular;

the two side bars extending upward from an upper face of the bottom plate and are adjacent to a back face of the front plate;

the top bar mounted on an upper end of each of the two side bars; and the base channel attached to the two side bars along the back face of the front plate and the upper face of the bottom plate; and the front guide mounted to a front face of the top bar.

19. For handling and loading heavy objects, such as a game animal, into an recreational vehicle having a bed, a winch, a winch line and a roof, a bed loader comprising a front guide, a top forward guide, and a top rear guide, the front guide configured to guide the winch line to the top forward guide;

the top forward guide configured to receive the winch line from the front guide and guide the winch line to the top rear guide;

the front guide mounted above the winch;

the top forward guide disposed aligned between the front guide and the top rear guide; the top rear guide receiving the winch line from the top forward guide and guiding the winch line to the bed of the recreational vehicle to the game animal to be loaded;

the top forward guide mounted forward of the top rear guide; the top rear guide guiding the winch line between the top forward guide and the bed of the recreational vehicle; and any of the front guide, the top forward guide, and the top rear guide further comprising a retaining means, the winch line disposed below the retaining means; and the retaining means retaining the winch line in any of the front guide, the top forward guide, and the top rear guide; and the retaining means being two retaining bars pointed opposite of the distal end of the other retaining bar.

20. The bed loader of claim 19 wherein the front guide, the top forward guide, and the top rear guide each comprise a guide means, a guide support, and the retaining means;

the guide means comprising a shaft bolt;

the guide support comprising a pair of first legs and a pair of second legs; one of the first legs substantially perpendicular and attached to one of the second legs with the other first leg substantially perpendicular and attached to the other second leg; the first legs running laterally traverse to a vehicle longitudinal axis; each of the second legs running upward from one of the first legs with each of the second legs disposed with the guide means mounted there between; and one of the retaining bars mounted to one of the second legs and the other retaining bar mounted to the other second leg.

* * * * *